United States Patent
Kim et al.

(10) Patent No.: US 11,618,964 B2
(45) Date of Patent: Apr. 4, 2023

(54) METHOD OF MANUFACTURING VEHICLE PART AND VEHICLE PART MANUFACTURED THEREBY

(71) Applicants: HYUNDAI MOTOR COMPANY, Seoul (KR); KIA MOTORS CORPORATION, Seoul (KR)

(72) Inventors: Hyun Kyung Kim, Hwaseong-si (KR); Dong Eun Cha, Hwaseong-si (KR); Jin Young Yoon, Gimpo-si (KR); Hai Chang Lee, Ansan-si (KR); Sun Young Park, Siheung-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 378 days.

(21) Appl. No.: 16/931,381

(22) Filed: Jul. 16, 2020

(65) Prior Publication Data
US 2021/0130971 A1 May 6, 2021

(30) Foreign Application Priority Data
Nov. 1, 2019 (KR) .......... 10-2019-0138591

(51) Int. Cl.
| | | |
|---|---|---|
| C25D 5/56 | (2006.01) | |
| C08L 9/06 | (2006.01) | |
| C08L 69/00 | (2006.01) | |
| H01B 1/24 | (2006.01) | |
| B60B 7/00 | (2006.01) | |
| B60R 19/52 | (2006.01) | |
| B60R 13/00 | (2006.01) | |
| B60R 13/04 | (2006.01) | |
| B60R 13/02 | (2006.01) | |

(52) U.S. Cl.
CPC .......... *C25D 5/56* (2013.01); *C08L 9/06* (2013.01); *C08L 69/00* (2013.01); *B60B 7/0046* (2013.01); *B60R 13/005* (2013.01); *B60R 13/02* (2013.01); *B60R 13/04* (2013.01); *B60R 19/52* (2013.01); *B60R 2019/525* (2013.01); *H01B 1/24* (2013.01)

(58) Field of Classification Search
None
See application file for complete search history.

(56) References Cited

U.S. PATENT DOCUMENTS

2004/0227688 A1* 11/2004 Aisenbrey ........ G06K 19/07749
343/873
2010/0006442 A1* 1/2010 Lochtman ................ C25D 5/56
205/291

FOREIGN PATENT DOCUMENTS

| JP | 2009-545671 A | 12/2009 |
| KR | 2018-0047449 A | 5/2018 |
| KR | 101957443 B1 | 3/2019 |

* cited by examiner

*Primary Examiner* — Jeffrey D Washville
(74) *Attorney, Agent, or Firm* — McDonnell Boehnen Hulbert & Berghoff LLP

(57) ABSTRACT

Disclosed are a method of manufacturing a vehicle member including pretreating the surface of an electrically conductive plastic molded product and forming a metal plating layer on the molded product, wherein the metal plating layer includes a copper plating layer, a nickel plating layer and a chromium plating layer, which are sequentially formed, and a vehicle member manufactured by the method.

7 Claims, 2 Drawing Sheets

METHOD OF MANUFACTURING VEHICLE PART AND VEHICLE PART MANUFACTURED THEREBY

CROSS-REFERENCE TO RELATED APPLICATION

This application claims, under 35 U.S.C. § 119(a), the benefit of priority to Korean Patent Application No. 10-2019-0138591 filed on Nov. 1, 2019, the entire contents of which are incorporated herein by reference.

BACKGROUND

(a) Technical Field

The present disclosure relates to a method of manufacturing a vehicle member and a vehicle member manufactured thereby that are capable of improving plating properties while reducing and simplifying the process.

(b) Background Art

Engineering plastics are a new class of materials that have been rapidly developed and are being used in place of metals in fields of mechanical parts and structural materials. Such engineering plastics can impart products both with significantly higher strength than general-purpose plastics used in everyday life and with significantly lower weight than metals. Based on these properties, research and development for replacing metal with engineering plastics is being actively performed in the fields of electric and electronics and machinery.

As an example, in the vehicle part field, efforts have been made to replace heavy metal parts with engineering plastics and thereby to lighten vehicles and improve fuel efficiency while increasing user safety.

Typically, in the field of exterior parts such as bumpers, radiator grilles, front grilles, body moldings, wheel caps, wheel covers and other peripheral parts, metal materials are particularly actively being replaced with engineering plastics.

The exterior parts for vehicles are required to realize color, appearance, design and the like according to a user's preferences and brand characteristics, and to provide excellent durability such as weather resistance, heat resistance and water resistance.

Accordingly, there is an increasing demand for technology that further improves physical properties through surface treatment such as plating, as well as enhances the physical properties of engineering plastic materials used in exterior parts for vehicles.

For example, Patent Document 1 (Korean Patent No. 10-1957443) discloses a plating method that is capable of realizing a multiple-color pattern by forming a decorative layer having a predetermined pattern on a non-conductive plastic surface and laminating a nickel plating layer and a chromium plating layer on the surface of the decorative layer.

Conventional surface treatment methods include forming a chemical plating layer on the surface of a plastic and then forming a metal plating layer on the chemical plating layer by electroplating. In this case, there are disadvantages in that the consumption of the metal used in the plating increases, as do manufacturing costs as the time required for plating lengthens, and it is thus not easy to achieve the production yield required by industry. When the chemical plating is omitted in order to overcome these disadvantages, the plating layer is easily peeled off from the surface of the plastic, and thus durability may deteriorate or defects may easily occur in the so manufacturing process.

Therefore, there is growing interest in manufacturing technology for vehicle members that are capable of easily realizing physical properties required for parts while reducing manufacturing costs.

The above information disclosed in this Background section is provided only for enhancement of understanding of the background, and therefore it may include information that does not form the prior art that is already known in this country to a person of ordinary skill in the art.

SUMMARY

The present disclosure has been made in an effort to solve the above-described problems associated with the prior art.

It is one object of the present disclosure to provide a method of manufacturing a vehicle member that is capable of reducing the manufacturing time and manufacturing costs and thus providing excellent economic advantages by realizing the effects of reducing and simplifying the process, and a vehicle member manufactured thereby.

It is another object of the present disclosure to provide a method of manufacturing a vehicle member that is capable of realizing excellent plating properties and exhibiting superior adhesive force between a molded article and a metal plating layer, and a vehicle member manufactured thereby.

The aforementioned objects of the present disclosure as well as other objects will be clearly understood from the following description and could be implemented by means defined in the claims and a combination thereof.

In one aspect, the present disclosure provides a method of manufacturing a vehicle member including pretreating the surface of an electrically conductive plastic molded product and forming a metal plating layer on the molded product, wherein the metal plating layer includes a copper plating layer, a nickel plating layer and a chromium plating layer, which are sequentially formed.

The method of manufacturing a vehicle member may further include forming a nickel strike layer on the surface of the electrically conductive plastic molded product before forming the metal plating layer.

The electrically conductive plastic molded product may include 100 parts by weight of a base resin including 40% to 60% by weight of acrylonitrile-butadiene-styrene (ABS) and 40% to 60% by weight of polycarbonate (PC) and 3 to 20 parts by weight of conductive carbon.

The conductive carbon may further include at least one of carbon nanotubes (CNTs), graphite or graphene.

In another aspect, the present disclosure provides a vehicle member having an electroplated surface of an electrically conductive plastic, manufactured by the aforementioned manufacturing method.

The vehicle member may include an electrically conductive plastic molded product and a metal plating layer formed on the surface of the molded product, wherein the metal plating layer includes a copper plating layer, a nickel plating layer and a chromium plating layer which are sequentially laminated from the surface of the molded product, and the electrically conductive plastic molded product may include 100 parts by weight of a base resin including 40% by weight to 60% by weight of acrylonitrile-butadiene-styrene (ABS) and 40% by weight to 60% by weight of polycarbonate (PC) and 3 to 20 parts by weight of conductive carbon.

The vehicle member may further include a nickel strike layer formed between the electrically conductive plastic molded product and the metal plating layer.

The vehicle member may have an adhesive force between the electrically conductive plastic molded product and the metal plating layer of 2 N/cm to 10 N/cm.

In the embodiments, the vehicle member may be any one of a radiator grille, a front grille, a speaker grille, a lamp cover, an emblem, lettering, a garnish, a molding, a wheel cap, and a wheel cover or a knob.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

DETAILED DESCRIPTION

Figure 1:
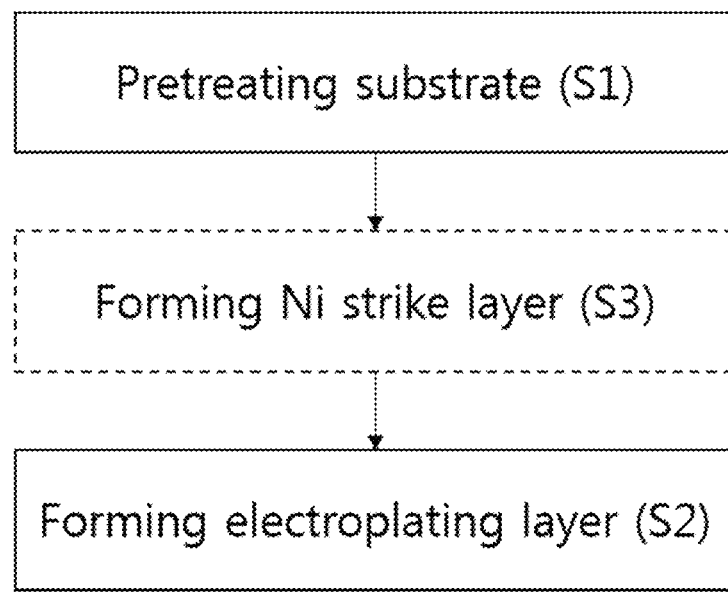
FIG. 1 is a schematic diagram illustrating a procedure of a method of manufacturing a vehicle member according to an embodiment of the present disclosure.

One aspect of the present disclosure is directed to a method of manufacturing a vehicle member including pretreating the surface of an electrically conductive plastic molded product and forming a metal plating layer on the molded product, wherein the metal plating layer includes a copper plating layer, a nickel plating layer so and a chromium plating layer, which are sequentially formed.

The method of manufacturing a vehicle member according to the present disclosure is capable of realizing the effects of reducing and simplifying the process to reduce the manufacturing time and manufacturing costs, thus providing a vehicle member that has excellent economic advantages, realizes excellent plating properties and exhibits superior adhesive force between the molded product and the metal plating layer.

Hereinafter, a method of manufacturing a vehicle member according to the present disclosure will be described in further detail with reference to the accompanying drawings.

In the present specification, the terms "upper" and "lower" are defined based on the drawing, wherein "upper" and "lower" may be interchanged with respect to each other depending on viewing position, and it will be understood that when an element is referred to as being "on" another element, it may be directly on the other element, or an intervening element may also be present and on the other hand, when an element is referred to as being "directly on", "right on", "directly formed on" or "directly in contact with" another element, there is no intervening element therebetween.

FIG. 1 is a schematic diagram illustrating a procedure of a method of so manufacturing a vehicle member according to an embodiment of the present disclosure. Referring to FIG. 1, the method of manufacturing a vehicle member includes pretreating the surface of an electrically conductive plastic molded product (S1) and forming a metal plating layer on the molded product (S2).

The metal plating layer includes a copper plating layer, a nickel plating layer and a chromium plating layer, which are sequentially formed. The copper plating layer, the nickel plating layer and the chromium plating layer are formed by electroplating rather than chemical plating.

In the pretreatment (S1), the surface of the electrically conductive plastic molded product molded into the shape of a vehicle part is pretreated to impart characteristics more suitable for electroplating thereto.

For example, the surface of the electrically conductive plastic molded product is divided into a plating region where the metal plating layer is to be formed and a non-plating region where the metal plating layer is not to be formed, and the pretreatment may be performed only in the plating region. In this case, the shape of the plating region can be controlled, and the shape and design pattern of the vehicle member can be implemented in various ways. In addition, manufacturing costs can be further reduced by further minimizing the plating area.

The pretreatment may include one or more of degreasing, etching and neutralization. The pretreatment further improves the electroplating suitability of the plating region, thereby further improving the adhesive force between the surface of the electrically conductive plastic molded product and the metal plating layer formed by electroplating.

The pretreatment may be carried out by preparing a pretreatment solution such as a degreasing solution, an etching solution or a neutralization solution, depending on the purpose, and then exposing the plating area of the electrically conductive plastic molded product to the pretreatment solution, or spraying the pretreatment solution onto the plating area of the electrically conductive plastic molded product.

In one embodiment, the degreasing solution may contain 80 to 120 ml/l of sulfuric acid ($H_2SO_4$). Under this condition, the degreasing efficiency can be excellent.

In one embodiment, the etching solution may contain 390 to 430 g/l of chromic anhydride and 400 to 440 g/l of sulfuric acid ($H_2SO_4$). Etching efficiency can be excellent under these conditions.

In one embodiment, the neutralization solution may contain 500 to 100 ml/l of hydrochloric acid (HCl). Under these conditions, the neutralization efficiency can be excellent.

The electrically conductive plastic molded product uses an electrically conductive plastic material, thereby significantly improving the adhesive force between the molded product and the metal plating layer while omitting a chemical plating process.

Since conventional plastics are not easily bonded to metals due to the difference in material therebetween, a method of increasing the adhesive force between the molded product and the metal plating layer through an expensive chemical plating process is used.

However, in the case of using an electrically conductive plastic molded product, as in the present disclosure, current applied during electroplating also flows on the surface of the electrically conductive plastic molded product, thereby realizing excellent electroplating suitability while omitting a chemical plating process.

In addition, omission of the chemical plating process realizes the effects of reducing and simplifying processing, thus reducing the manufacturing time as well as manufacturing costs, thereby providing excellent economic advantages.

In addition, omission of the chemical plating process reduces the amount of expensive metals that are used in the entire plating layer and realizes excellent physical properties while reducing the thickness of the plating layer.

The electrically conductive plastic molded product may include one or more of acrylonitrile-butadiene-styrene (ABS), polycarbonate (PC), polyacetal (POM), polyamide (PA), polybutylene terephthalate (PBT) and polyphenylene oxide (PPO). As a result, the surface treatment method of the resin molded product of the present disclosure can significantly improve the adhesive force between the molded product and the metal plating layer while omitting the chemical plating process, unlike the conventional surface treatment method. In addition, when the electrically conductive plastic molded product exemplified above is used, a degree of strength suitable for use in vehicle members can be obtained.

Specifically, when the electrically conductive plastic molded product includes one or more of acrylonitrile-butadiene-styrene (ABS) and polycarbonate (PC), the molded product can exert further improved electrical conductivity, and thus the aforementioned effects can be further improved and properties more suitable for use in resin molding products for vehicle parts can be realized owing to excellent mechanical properties thereof.

More specifically, when the electrically conductive plastic molded product includes both acrylonitrile-butadiene-styrene (ABS) and polycarbonate (PC), both the electrical conductivity and mechanical properties of the molded product can be further improved.

In one embodiment, the electrically conductive plastic molded product may include 45% by weight to 60% by weight of acrylonitrile-butadiene-styrene (ABS) and 40% by weight to 60% by weight of polycarbonate (PC) as a base resin. Within the above content ranges, electrical conductivity as well as compatibility and mechanical properties of the molded product can be excellent. For example, the base resin may include 45% by weight to 55% by weight of acrylonitrile-butadiene-styrene (ABS) and 45% by weight to 55% by weight of polycarbonate (PC).

The electrically conductive plastic molded product may further include at least one conductive carbon of carbon nanotubes (CNTs), graphite, or graphene. In this case, the surface treatment method of the present disclosure can further improve the effect of improving the adhesive force between the molded product and the metal plating layer while omitting the chemical plating process.

In one embodiment, the average size of the conductive carbon may be 0.1 to 500 μm. The size may be a maximum length of the conductive carbon. Under the above condition, electrical conductivity of the molded product can be excellent and miscibility and dispersibility when mixed with the base resin can be excellent.

The conductive carbon may be present in an amount of 3 to 20 parts by weight based on 100 parts by weight of the basic resin. Within the range, compatibility, miscibility and dispersibility with the base resin can be excellent, the electrical conductivity and mechanical properties of the molded product can be further improved, the adhesive force between the molded product and the metal plating layer can be further improved, and economic advantages associated with manufacturing costs can be obtained. For example, the conductive carbon may be present in an amount of 5 to 12 parts by weight, more specifically 5 to 10 parts by weight.

In one embodiment, the electrically conductive plastic molded product includes 3 to 20 parts by weight of conductive carbon based on 100 parts by weight of the base resin, including 40% to 60% by weight of acrylonitrile-butadiene-styrene (ABS) and 40% to 60% by weight of polycarbonate (PC). In this case, the electrical conductivity and mechanical properties of the molded product can be further improved. In addition, the thermal conductivity can be improved and excellent weather resistance and heat resistance can be obtained when applied to vehicle members.

Forming the metal plating layer (S2) includes electroplating the electrically conductive plastic molded product to form a copper plating layer. The copper plating layer thus formed serves as a buffer for the entire plating layer and the electrically conductive plastic molded product. In this case, the vehicle member can prevent damage to the surface treatment layer due to the difference in hardness between the molded product and the metal plating layer when an external impact is applied thereto.

The copper plating layer may have a thickness of 1 μm to 30 μm, specifically 5 μm to 20 μm, and more specifically 10 μm to 20 μm. Within this range, the buffering property can be further improved.

A copper-plating bath for forming the copper plating layer may include copper sulfate and sulfuric acid. For example, the copper-plating bath may include 190 to 230 g/l of copper sulfate ($CuSO_4 \cdot 5H_2O$) and 48 to 58 g/l of sulfuric acid ($H_2SO_4$). The copper sulfate is a source of copper ions and increases the electrical conductivity. The copper sulfate is present at a concentration of 190 to 230 g/l in the copper-plating bath. When the copper sulfate is present in the above concentration range, copper-plating efficiency and electrical conductivity can be excellent. The copper sulfate is present at a concentration of 48 to 58 g/l in the copper-plating bath. When the copper sulfate is present in the above concentration range, the conductivity of the plating bath can be excellent and the copper-plating rate and the quality of the copper plating layer can be superior. For example, the copper-plating bath may further include at least one of 30 to 150 mg/l of a chlorine ion or 1 to 10 ml/l of a surfactant.

In one embodiment, the reaction temperature when the copper plating layer is formed may be 15 to 30° C., specifically 18 to 28° C. Within this range, the copper plating layer can be formed more efficiently.

In one embodiment, when forming the copper plating layer, the current density may be 1 to 30 $A/dm^2$, for example, 1 to 10 $A/dm^2$. Within this range, the copper plating layer can be formed more efficiently.

Forming the metal plating layer (S2) includes electroplating the copper plating layer to form at least one nickel plating layer. The nickel plating layer may have a multi-layer structure including one or more layers, specifically two to three layers, and more specifically two layers. The nickel plating layer thus formed serves to improve the appearance.

Specifically, the nickel plating layer may serve as at least one of a semi-gloss function layer, a gloss function layer, an adhesion-facilitating layer and a corrosion protection layer. The semi-gloss function layer may be a nickel plating layer containing no sulfur. The gloss function layer may be a nickel plating layer containing sulfur. The adhesion-facilitating layer may be a nickel plating layer having a sulfur content higher than that of the gloss function layer.

In one embodiment, the nickel plating layer may include a first nickel plating layer having a gloss function and a second nickel plating layer having a function of preventing corrosion which are laminated sequentially from the molded product.

In another embodiment, the nickel plating layer may include a first nickel plating layer having a semi-gloss function, a second nickel plating layer having a gloss function, and a third nickel plating layer having a function of preventing corrosion, which are sequentially laminated from the molded product.

In another embodiment, the nickel plating layer may include a first nickel plating layer containing no sulfur and having a semi-gloss function, an adhesion-facilitating nickel plating layer containing 0.2% by weight or more of sulfur and improving the adhesion of the first nickel plating layer and the second nickel plating layer, and a second nickel plating layer containing less than 0.2% by weight of sulfur and having a gloss function, which are sequentially laminated from the molded product.

The nickel plating layer may have a single layer thickness of 1 μm to 15 μm, specifically 1 μm to 10 μm, and more specifically 1 μm to 5 μm. Within this range, the individual functionalities of the nickel plating layer can be further improved.

In one embodiment, the nickel plating bath may include 160 to 350 g/l of nickel sulfate, 25 to 60 g/l of nickel chloride and 35 to 47 g/l of boric acid when the nickel plating layer is formed.

The nickel sulfate ($NiSO_4 \cdot 6H_2O$) may be included as a main source of nickel ions. The nickel sulfate may be present in an amount of 160 to 350 g/l in the nickel plating bath. When nickel sulfate is present in an amount within the above range, plating efficiency and plating layer quality can be excellent.

The nickel chloride ($NiCl_2 \cdot 6H_2O$) may be included as a source of nickel ions and a source of chloride ions. The nickel chloride may be present in an amount of 25 to 60 g/l in the nickel plating bath. When nickel chloride is present in an amount within the above range, plating efficiency and plating layer quality can be excellent.

The boric acid ($H_3BO_3$) may be included to control the pH of the nickel plating bath. The boric acid may be present in an amount of 35 to 47 g/l in the nickel plating bath. Within the above content range, the nickel plating rate can be high and the plating quality can be excellent.

In one embodiment, the first nickel plating bath for forming the first nickel plating layer may include 250 to 300 g/l of nickel sulfate, 35 to 45 g/l of nickel chloride, and 37 to 47 g/l of boric acid. When the first nickel plating bath satisfying the above conditions is applied, the plating quality can be excellent.

In one embodiment, the second nickel plating bath for forming the second nickel plating layer may include 250 to 300 g/l of nickel sulfate, 35 to 45 g/l of nickel chloride and 37 to 47 g/l of boric acid. When the second nickel plating bath satisfying the above conditions is applied, the gloss and plating quality of the plating layer can be excellent.

In one embodiment, the third nickel plating bath for forming the third nickel plating layer may include 260 to 300 g/l of sulfate nickel, 50 to 60 g/l of nickel chloride, and 35 to 47 g/l of boric acid. When the third nickel plating bath satisfying the above conditions is applied, microporosity is imparted to the surface of the plating layer, so that corrosion resistance can be increased and plating quality can be excellent.

In one embodiment, the nickel plating layer can include the first nickel plating layer, the second nickel plating layer, and the third nickel plating layer formed in a thickness ratio of 1:0.5 to 3:1 to 2. In the thickness ratio, the formation efficiency of the plating layer, the corrosion resistance of the plating layer, and adhesion can be excellent. For example, the thickness ratio may be 1:0.5 to 1.5:1.5 to 2.

When the nickel plating layer is formed, the reaction temperature may be 35° C. to 60° C. Within this range, the nickel plating layer can be formed more efficiently.

When the nickel plating layer is formed, the current density may be 1 to 30 A/dm$^2$, for example, 1 to 10 A/dm$^2$. Within this range, the nickel plating layer can be formed more efficiently.

The forming the metal plating layer (S2) includes electroplating the surface of the nickel plating layer to form a chrome plating layer. The chromium plating layer thus formed serves to realize the appearance. In this case, the vehicle member does not cause discoloration in an exterior part thereof, has high hardness and excellent durability, and provides a luxurious metallic appearance.

The chromium plating layer may have a thickness of 1 μm to 30 μm, specifically 5 μm to 20 μm, and more specifically 10 μm to 20 μm. Within this range, appearance, discoloration prevention and durability can be further improved.

The chromium plating bath for forming the chromium plating layer may include 250 to 300 g/l of chromic anhydride ($CrO_3$) and 0.6 to 1.4 g/l of sulfuric acid ($H_2SO_4$).

The chromic anhydride may be present in an amount of 250 to 300 g/l in the chromium plating bath. When chromic anhydride is present in an amount within the range, the adhesion, corrosion resistance and plating quality of the chromium plating layer can be excellent.

The sulfuric acid may be present in an amount of 0.6 to 1.4 g/l in the chromium plating bath. When the sulfuric acid is present in an amount within the above range, the supply efficiency of sulfate ions can be excellent and the chromium plating rate and plating quality can thus be excellent.

When the chromium plating layer is formed, the reaction temperature may be 25° C. to 65° C. Within this range, the chromium plating layer can be formed more efficiently.

When forming the chromium plating layer, the current density may be 10 to 70 A/dm$^2$, for example, 25 to 65 A/dm$^2$. Within this range, the chromium plating layer can be formed more efficiently.

The method of manufacturing a vehicle member may further include forming a nickel strike layer on the surface of the electrically conductive plastic molded product (S3) before forming the metal plating layer (S2).

The nickel strike layer is formed by electroplating, and serves to further improve the adhesion between the electrically conductive plastic molded product and the metal plating layer.

In one embodiment, the nickel strike layer may be formed using a nickel strike plating bath. The nickel strike plating bath may include 160 to 200 g/l of nickel sulfate, 40 to 60 g/l of nickel chloride and 35 to 45 g/l of boric acid. When the plating layer is formed by applying the nickel strike plating bath under the above conditions, adhesion of the plating layer can be excellent.

The strike layer may have a single layer thickness of 0.01 μm to 5 μm, specifically 0.1 μm to 5 μm, and more specifically 1 μm to 5 μm. Within this range, the adhesion between the molded product and the metal plating layer can be further improved, and electroplating suitability can be further improved.

The vehicle member to which the manufacturing method of the present disclosure can be applied may be any one of, for example, a radiator grille, a front grille, a speaker grille, a lamp cover, an emblem, lettering, a garnish, a molding, a wheel cap, a wheel cover and a knob.

Another embodiment of the present disclosure is directed to a vehicle member having an electroplated surface of an electrically conductive plastic, manufactured by the aforementioned manufacturing method.

The vehicle member may include an electrically conductive plastic molded product and a metal plating layer formed on the surface of the molded product, wherein the metal plating layer includes a copper plating layer, a nickel plating layer and a chromium plating layer, which are sequentially laminated from the surface of the molded product, and the electrically conductive plastic molded product may include 3 to 20 parts by weight of conductive carbon with respect to 100 parts by weight of a base resin including 40% by weight to 60% by weight of acrylonitrile-butadiene-styrene (ABS) and 40% by weight to 60% by weight of polycarbonate (PC).

The vehicle member may be any one of a radiator grille, a front grille, a speaker grille, a lamp cover, an emblem, lettering, a garnish, a molding, a wheel cap, a wheel cover and a knob. In this case, the vehicle member can realize excellent plating properties and high adhesion between the molded product and the metal plating layer, thus more suitably exhibiting excellent durability.

Figure 2:
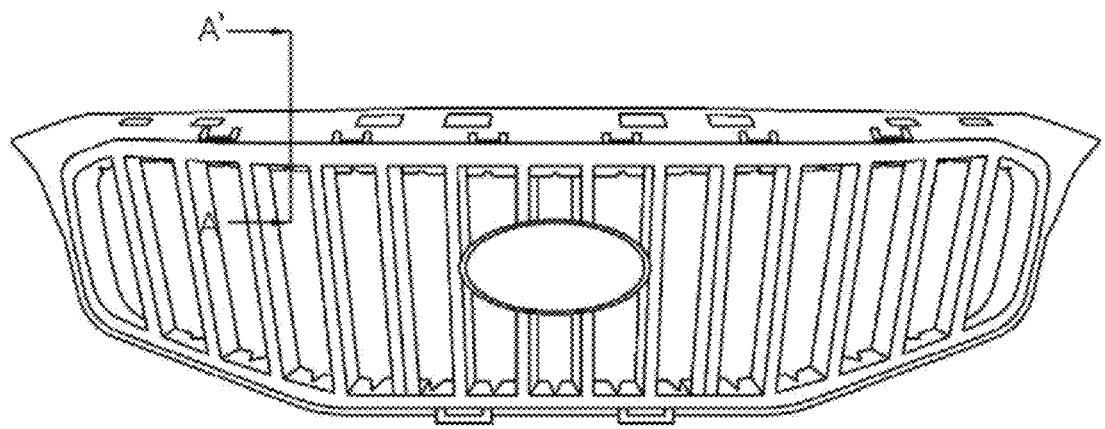
FIG. 2 shows an exemplary embodiment in which the vehicle member according to one embodiment of the present disclosure is applied to a radiator grill 100.

FIG. 2 illustrates an exemplary case in which the vehicle member according to one embodiment of the present disclosure is applied as a radiator grill 100. In this embodiment, the vehicle member of the present disclosure can be molded into a complicated shape compared to a metal material, but can realize strength comparable to a metal and reduce the weight of the vehicle body.

Figure 3:
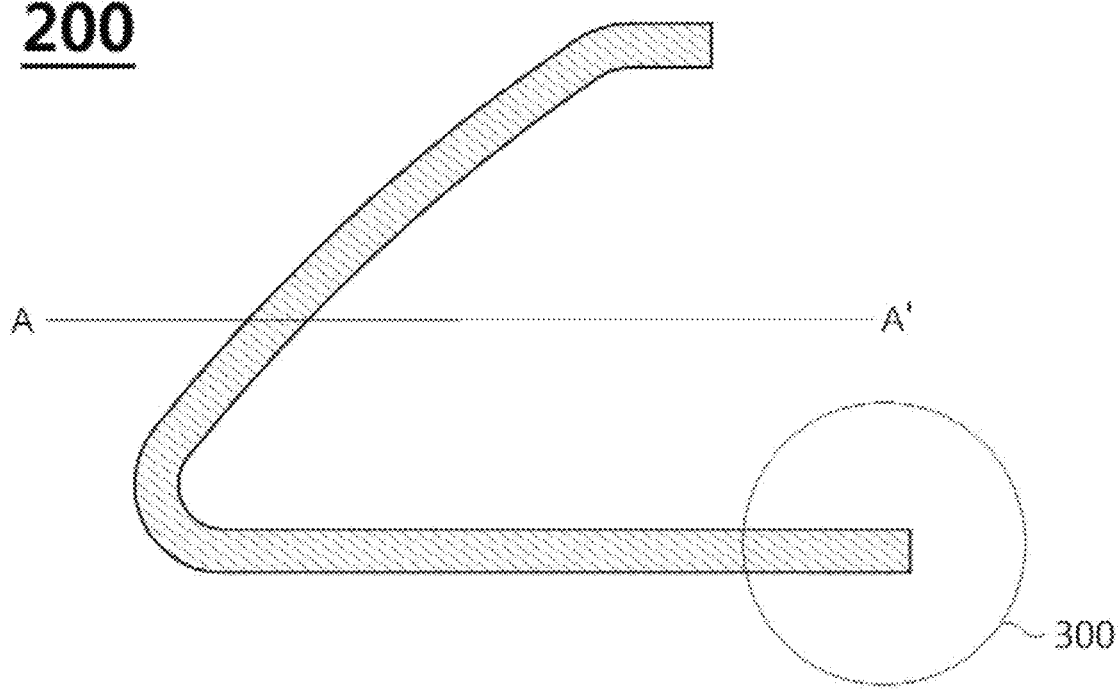
FIG. 3 is a sectional view 200 showing a vehicle member according to an embodiment of the present disclosure.

FIG. 3 is a sectional view 200 of a vehicle member according to one embodiment of the present disclosure. FIG. 3 shows a side cross-sectional structure taken along line in A-A' of the surface-treated resin molded product of FIG. 2.

Figure 4:
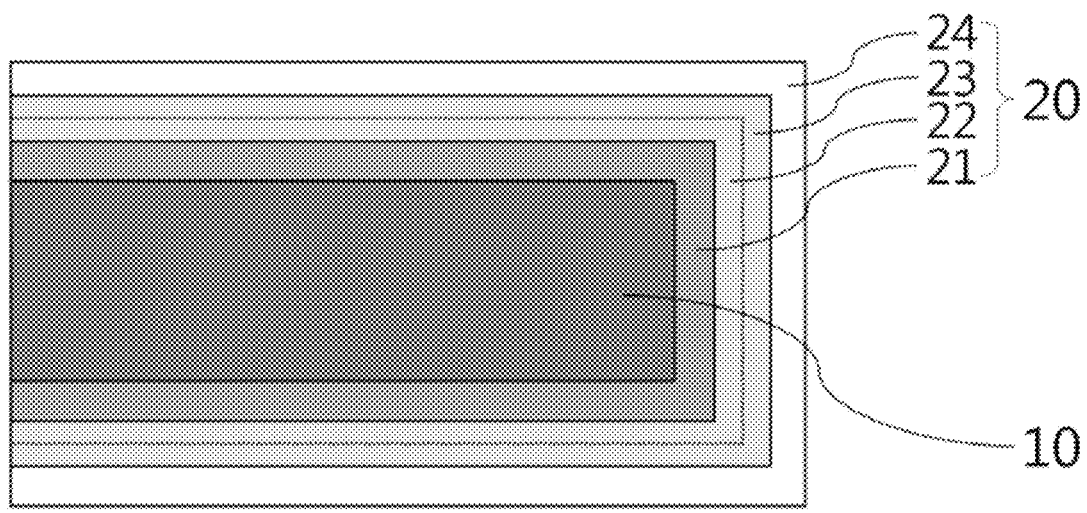
FIG. 4 is a partial sectional view 300 showing a vehicle member according to an embodiment of the present disclosure.

FIG. 4 is a partial cross-sectional view 300 of a vehicle member according to one embodiment of the present disclosure. FIG. 4 exemplarily shows a cross-sectional structure of part B of the cross section of the surface-treated resin molded product of FIG. 3. Referring to 4, the vehicle member is surface-treated by the above-described surface treatment method, and includes an electrically conductive plastic molded product 10, and a metal plating layer 20 including at least one copper plating layer 21, for example, two or more nickel plating layers 22 and 23, and a chromium plating layer 24, which are sequentially laminated on the molded product 10.

The copper plating layer serves as a buffer of the entire plating layer and the electrically conductive plastic molded product. In this case, the vehicle member can prevent damage to the surface treatment layer due to the difference in hardness between the molded product and the metal plating layer when an external impact is applied thereto.

The copper plating layer may have a thickness of 1 μm to 30 μm, specifically 5 μm to 20 μm, and more specifically 10 μm to 20 μm. Within this range, the buffering property can be further improved.

The nickel plating layer may have a single-layer structure or a multi-layered structure including one or more layers. In some example embodiments, the multi-layered structure comprises two to three layers. In some example embodiments, the multi-layered structure comprises two layers. The nickel plating layer thus formed exhibits an improved appearance.

Specifically, the nickel plating layer may serve as at least one of a semi-gloss function layer, a gloss function layer, an adhesion-facilitating layer and a corrosion protection layer. The semi-gloss function layer may be a nickel plating layer containing no sulfur. The gloss function layer may be a nickel plating layer containing sulfur. The adhesion-facilitating layer may be a nickel plating layer having a sulfur content higher than that of the gloss function layer.

In one embodiment, the nickel plating layer may include a first nickel plating layer, a second nickel plating layer, and a third nickel plating layer formed at a thickness ratio of 1:0.5 to 3:1 to 2. Within this thickness ratio, the formation efficiency of the plating layer, the corrosion resistance of the plating layer and adhesion can be excellent. For example, the thickness ratio may be 1:0.5 to 1.5:1.5 to 2.

The nickel plating layer may have a single-layer thickness of 1 μm to 15 μm, specifically 1 μm to 10 μm, and more specifically 1 μm to 5 μm. Within this range, the individual functionalities of the nickel plating layer can be further improved.

The chromium plating layer serves to realize the appearance. In this case, the vehicle member does not undergo discoloration in an exterior part thereof, has high hardness and thus excellent durability, and realizes a luxurious metallic appearance.

The chromium plating layer may have a thickness of 1 μm to 30 μm, specifically 5 μm to 20 μm, and more specifically 10 μm to 20 μm. Within this range, appearance, discoloration prevention and durability can be further improved.

In addition, the vehicle member may further include a nickel strike layer (not shown) formed between the electrically conductive plastic molded product and the metal plating layer.

The nickel strike layer is formed by electroplating, and serves to further improve the adhesion between the electrically conductive plastic molded product and the metal plating layer.

The strike layer may have a single layer thickness of 0.01 μm to 5 μm, specifically 0.1 μm to 5 μm, and more specifically 1 μm to 5 μm. Within this range, the adhesion between the molded product and the metal plating layer can be further improved, and suitability for electroplating can be further improved.

Each of the copper plating layer 21, the nickel strike layer (not shown), the one or more nickel plating layers 22 and 23, and the chromium plating layer 24 is as described above.

The vehicle member may have an adhesive force between the electrically conductive plastic molded product and the metal plating layer of 2 N/cm to 10 N/cm. In some embodiments, the metal plating layer comprises 2 N/cm to 8 N/cm. In some embodiments, the metal plating layer comprises 3 N/cm to 6 N/cm. Within this range, the vehicle member may be more suitable for use in resin molded articles for vehicles due to the further improved durability thereof.

EXAMPLE

Hereinafter, the present disclosure will be described in more detail with reference to examples and comparative examples. However, these examples are provided only for illustration of the present disclosure and should not be construed as limiting the scope of the present disclosure.

Example 1

100 parts by weight of a base resin, containing 45 to 55% by weight of an acrylonitrile-butadiene-styrene (ABS) resin and 45 to 55% by weight of a polycarbonate (PC) resin, and 5 to 8 parts by weight of carbon nanotubes (CNTs) were kneaded and then injection-molded to produce an electrically conductive plastic molded product having a thickness of 1 to 10 mm and having a radiator grill shape.

The plastic molded product was degreased by immersion in a degreasing solution containing 80 to 120 ml/l of sulfuric acid ($H_2SO_4$), etched by immersion in an etching solution containing 390 to 430 g/l of chromic anhydride and 400 to 440 g/l of sulfuric acid ($H_2SO_4$), and neutralized by immersion in a neutralization solution containing 500 to 100 ml/l of hydrochloric acid (HCl) to pretreat the plastic molded product.

The pretreated plastic molded product was immersed in a copper-plating bath containing 190 to 230 g/l of copper sulfate ($CuSO_4.5H_2O$) and 48 to 58 g/l of sulfuric acid ($H_2SO_4$), and a copper plating layer having a thickness of 5 to 25 was formed at a current density of 5 to 15 A/dm$^2$ at 25 to 35° C.

The plastic molded product including the copper plating layer formed thereon was immersed in a first nickel plating bath containing 250 to 300 g/l of nickel sulfate, 35 to 45 g/l of nickel chloride and 37 to 47 g/l of boric acid, and was then plated to a thickness of 1 to 15 at a current density of 10 to 50 A/dm$^2$ at 25 to 45° C. to form a first nickel plating layer, the plastic molded product including the first nickel plating layer formed thereon was immersed in a second nickel plating bath containing 250 to 300 g/l of nickel sulfate, 35 to 45 g/l of nickel chloride and 37 to 47 g/l of boric acid and was then plated to a thickness of 1 to 15 at a current density of 10 to 50 A/dm$^2$ at 25 to 45° C. to form a second nickel plating layer, and the plastic molded product including the second nickel plating layer formed thereon was immersed in a third nickel plating bath containing 260 to 300 g/l of nickel sulfate, 50 to 60 g/l of nickel chloride and 37 to 47 g/l of boric acid and then plated to a thickness of 1 to 15 at a current density of 10 to 50 A/dm$^2$ at 25 to 45° C. to form a third nickel plating layer.

The plastic molded product including the nickel plating layer formed thereon was immersed in a chromium plating bath containing 250 to 300 g/l of chromic anhydride ($CrO_3$) and 0.6 to 1.4 g/l of sulfuric acid ($H_2SO_4$), and was then plated to a thickness of 1 to 15 μm at a current density of 10 to 60 A/dm$^2$ at 35 to 65° C. to form a chromium plating layer.

A resin molded article specimen shown in FIG. 2 was produced in the same manner as above by sequentially forming a copper plating layer, a first nickel plating layer, a second nickel plating layer, a third nickel plating layer and a chromium plating layer on the surface of the electrically conductive plastic molded product, followed by surface-treating.

Example 2

A vehicle member was produced by sequentially forming a copper plating layer, a first nickel plating layer, a second nickel plating layer, a third nickel plating layer and a chromium plating layer in the same manner as in Example 1, except that the pretreated plastic molded product was immersed in a nickel strike plating bath containing 160 to 200 g/l of nickel sulfate, 40 to 60 g/l of nickel chloride and 35 to 45 g/l of boric acid and was then plated to a thickness of 0.1 to 5 at a current density of 10 to 50 A/dm$^2$ at 25 to 45° C. to form a nickel strike plating layer.

Comparative Example 1

A vehicle member was produced in the same manner as in Example 1, except that a resin containing 45 to 55% by weight of an acrylonitrile-butadiene-styrene (ABS) resin and 45 to 55% by weight of a polycarbonate (PC) resin was injection-molded to realize a plastic molded product having a thickness of 1 to 10 mm.

<Physical Property Evaluation>

The physical properties of the surface-treated resin molded article specimens produced in Examples and Comparative Examples were evaluated in accordance with the following method. The results are shown in Table 1 below.

(1) Adhesive force (N/cm): The adhesive force was measured according to the standard of Hyundai Kia Motors MS625-04. Specifically, specimens having a width of 10 mm and a length of 50 mm for vehicle members of Examples 1 and 2 and Comparative Example 1 were prepared, and then the adhesive force was measured at a test speed of 50 mm/min using an adhesion tester. The results are shown in Table 1 below.

TABLE 1

| Item | Example 1 | Example 2 | Comparative Example 1 |
|---|---|---|---|
| Adhesive force (N/cm) | 4.8 | 4.9 | 1.7 |

As can be seen from Table 1, Example 1 of the present disclosure can significantly improve adhesion between the molded product and the metal plating layer while omitting a chemical plating process.

Therefore, the method of manufacturing a vehicle member according to the present disclosure and the vehicle member surface-treated by the method are capable of realizing effects of reducing and simplifying the process to reduce the manufacturing time as well as manufacturing costs, and thus providing considerably excellent economic advantages, realizing excellent plating properties and exhibiting superior adhesive force between the molded product and the metal plating layer.

As is apparent from the foregoing, the present disclosure provides a method of manufacturing a vehicle member and a vehicle member surface-treated by the method that are capable of realizing the effects of reducing and simplifying processing to reduce manufacturing time as well as manufacturing costs, thus providing excellent economic advantages, realizing excellent plating properties, and exhibiting superior adhesive force between the molded product and the metal plating layer.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A method of manufacturing a vehicle member comprising:
    pretreating a surface of an electrically conductive plastic molded product; and
    forming a metal plating layer on the molded product,
    wherein the metal plating layer comprises a copper plating layer, a nickel plating layer and a chromium plating layer, which are sequentially formed,
    wherein the vehicle member formed an adhesive force between the electrically conductive plastic molded product and the metal plating layer of 2 N/cm to 10 N/cm.

2. The method according to claim 1, further comprising: forming a nickel strike layer on the surface of the electrically conductive plastic molded product before forming the metal plating layer.

3. The method according to claim 1, wherein the electrically conductive plastic molded product comprises:
 100 parts by weight of a base resin comprising 40% to 60% by weight of acrylonitrile-butadiene-styrene (ABS) and 40% to 60% by weight of polycarbonate (PC); and
 3 to 20 parts by weight of conductive carbon.

4. The method according to claim 3, wherein the conductive carbon comprises at least one of carbon nanotubes (CNTs), graphite or graphene.

5. The method according to claim 1, wherein the vehicle member is any one of a radiator grille, a front grille, a speaker grille, a lamp cover, an emblem, lettering, a garnish, a molding, a wheel cap, a wheel cover or a knob.

6. A vehicle member comprising:
 an electrically conductive plastic molded product; and
 a metal plating layer formed on the surface of the molded product,
 wherein the metal plating layer comprises a copper plating layer, a nickel plating layer and a chromium plating layer which are sequentially laminated from the surface of the molded product, and
 wherein the electrically conductive plastic molded product comprises:
 100 parts by weight of a base resin comprising 40% by weight to 60% by weight of acrylonitrile-butadiene-styrene (ABS) and 40% by weight to 60% by weight of polycarbonate (PC); and
 3 to 20 parts by weight of conductive carbon,
 wherein the vehicle member has an adhesive force between the electrically conductive plastic molded product and the metal plating layer of 2 N/cm to 10 N/cm.

7. The vehicle member according to claim 6, further comprising a nickel strike layer formed between the electrically conductive plastic molded product and the metal plating layer.

* * * * *